(12) United States Patent
Lee et al.

(10) Patent No.: US 8,144,961 B2
(45) Date of Patent: Mar. 27, 2012

(54) ULTRASOUND DIAGNOSTIC APPARATUS AND METHOD FOR MEASURING A SIZE OF A TARGET OBJECT

(75) Inventors: Jin Yong Lee, Seoul (KR); Won Gee Oh, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 1182 days.

(21) Appl. No.: 11/873,903

(22) Filed: Oct. 17, 2007

(65) Prior Publication Data

US 2008/0097209 A1 Apr. 24, 2008

(30) Foreign Application Priority Data

Oct. 18, 2006 (KR) .................. 10-2006-0101463

(51) Int. Cl.
*G06K 9/00* (2006.01)

(52) U.S. Cl. ...................................... 382/131; 600/437

(58) Field of Classification Search .......... 600/437–467; 382/128–132
See application file for complete search history.

(56) References Cited

U.S. PATENT DOCUMENTS

| | | | | |
|---|---|---|---|---|
| 5,510,838 A * | 4/1996 | Yomdin et al. | ............. | 348/384.1 |
| 5,588,435 A | 12/1996 | Weng et al. | | |
| 5,960,118 A * | 9/1999 | Briskin et al. | ................ | 382/243 |
| 6,217,520 B1 * | 4/2001 | He et al. | ........................ | 600/467 |
| 6,290,648 B1 * | 9/2001 | Kamiyama | ................... | 600/443 |
| 6,760,483 B1 * | 7/2004 | Elichai et al. | ................. | 382/241 |
| 6,985,625 B1 * | 1/2006 | Silver et al. | ................... | 382/195 |
| 7,004,904 B2 * | 2/2006 | Chalana et al. | ............... | 600/443 |
| 8,036,441 B2 * | 10/2011 | Frank et al. | ................... | 382/131 |
| 2002/0102023 A1 | 8/2002 | Yamauchi | | |
| 2004/0024315 A1 * | 2/2004 | Chalana et al. | ............... | 600/443 |
| 2009/0257554 A1 * | 10/2009 | Parks | .............................. | 378/44 |

* cited by examiner

*Primary Examiner* — Sanjay Cattungal
(74) *Attorney, Agent, or Firm* — Oblon, Spivak, McClelland, Maier & Neustadt, L.L.P.

(57) ABSTRACT

An ultrasound diagnostic apparatus for providing on a display an ultrasound image including a target object and a pointer movable on the ultrasound image, comprises: an ultrasound image providing unit configured to provide an ultrasound image including a target object; a contour line extracting unit configured to extract a contour line of the target object in the ultrasound image; a coordinate recognizing unit configured to detect cross points while the pointer crosses the contour line and recognize the coordinates of the corner points; a user input unit configured to receive instructions from a user, said instructions including a selection instruction to select measure points among the cross points and a measure instruction to measure a size of the target object; a measuring unit configured to measure a size of the target object in response to the measure instruction based on coordinates of the measure points selected in response to the selection instruction; and an output unit configured to output the ultrasound image, the pointer, the contour line, the measure points and the size of the target object.

10 Claims, 6 Drawing Sheets

ULTRASOUND DIAGNOSTIC APPARATUS AND METHOD FOR MEASURING A SIZE OF A TARGET OBJECT

The present application claims priority from Korean Patent Application No. 10-2006-0101463 filed on Oct. 18, 2006, the entire subject matter of which is incorporated herein by reference.

BACKGROUND

1. Field

The present invention generally relates to ultrasound diagnostic fields, and more particularly to an ultrasound diagnostic apparatus and method for measuring a size of a target object in an ultrasound image.

2. Background

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional images of internal features of an object (e.g., human organs).

The ultrasound system generally uses a probe containing a wide bandwidth transducer to transmit and receive ultrasound signals. The ultrasound system forms images of human internal tissues by electrically exciting an acoustic transducer element or an array of acoustic transducer elements to generate ultrasound signals that travel into the body. The ultrasound signals produce ultrasound echo signals since they are reflected from body tissues, which appear as discontinuities to the propagating ultrasound signals. Various ultrasound echo signals return to the transducer element and are converted into electrical signals, which are amplified and processed to produce ultrasound data for an ultrasound image of the tissues.

The ultrasound image is outputted through an output device such as a monitor, a screen or the like. A user of the ultrasound diagnostic apparatus determines a status, a position, a size, etc. of the target object desired to observe through the ultrasound image containing the target object. In order to measure a size, i.e., depth, width and volume of the target object according to the prior art, the user determines a contour line of the target object with a naked eye and selects points on the contour line, thereby computing a distance between the points. However, since the ultrasound image is easily degraded due to noises, it may be difficult for the user to determine the contour line of the target. Also, an extensive amount of time is consumed due to a minute operation for determining the contour line.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
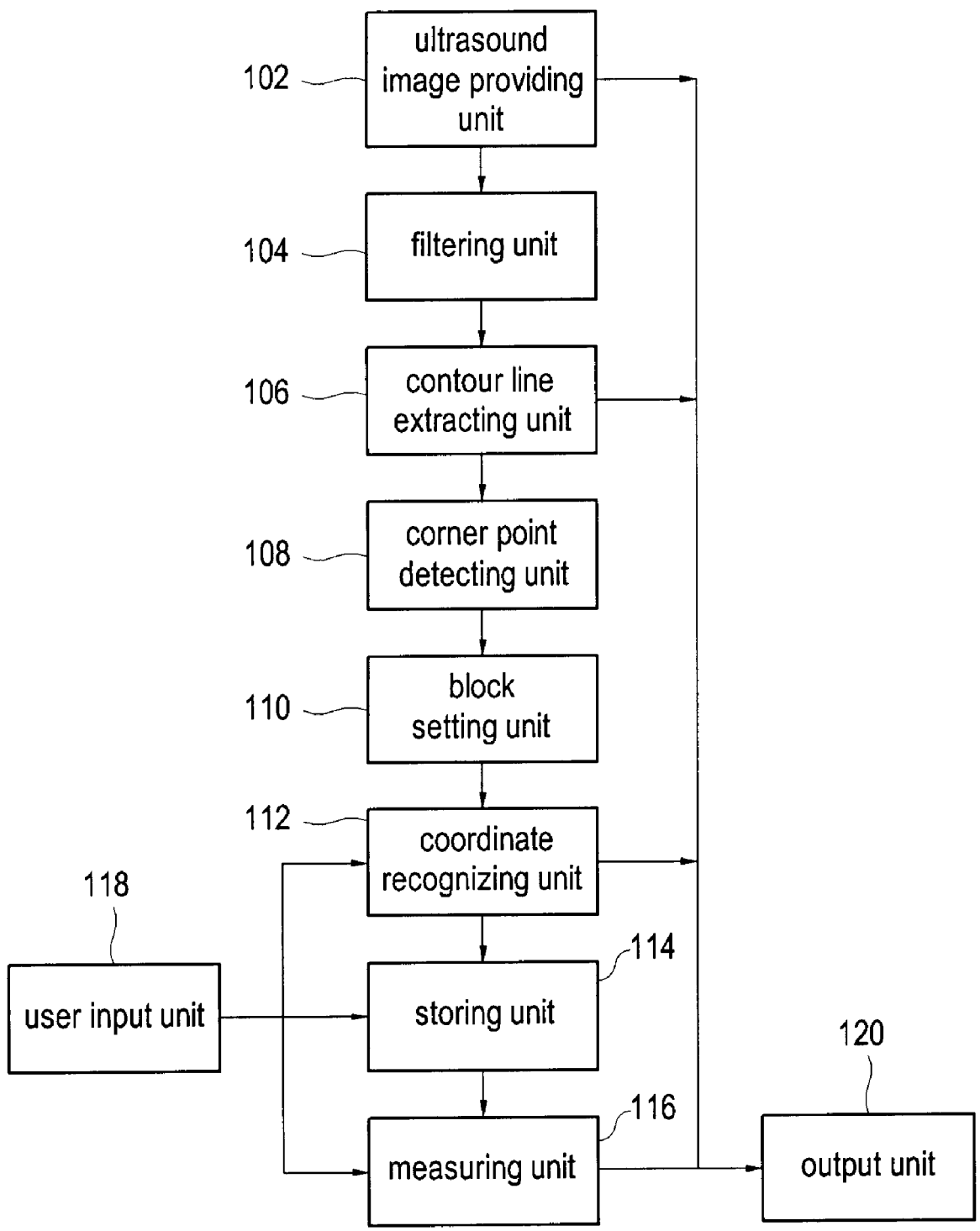
FIG. 1 is a block diagram showing an ultrasound diagnostic apparatus for measuring a size of a target object in accordance with one embodiment of the present invention.

FIG. 1 is a block diagram showing an ultrasound diagnostic apparatus for measuring a size of a target object in accordance with one embodiment of the present invention. As shown in FIG. 1, the ultrasound diagnostic apparatus 100 includes an ultrasound image providing unit 102, a filtering unit 104, a contour line extracting unit 106, a corner point detecting unit 108, a block setting unit 110, a coordinate recognizing unit 112, a storing unit 114, a measuring unit 116, a user input unit 118 and an output unit 120. The user input unit 118 may include a mouse, and the output unit 118 may include a monitor.

The ultrasound image providing unit 102 provides a 2-dimensional or a 3-dimensional ultrasound image for a target object. The filtering unit 104 filters the ultrasound image provided from the ultrasound image providing unit 102 to remove the noises. For example, the filtering unit 104 may include an average filter or a median filter to remove the noises from the ultrasound image and then perform a smoothing process for the ultrasound image.

The contour line extracting unit 106 extracts a contour line of the target object, which indicates bounds of regions in the ultrasound image. Generally, the ultrasound image may be divided into a first region corresponding to the target object, desired to be observed, and a second region corresponding to a background. The contour line may include a lot of information such as a position, a shape and a size of the target object. The contour extracting unit 106 uses a histogram of the ultrasound image to determine a critical value for extracting the contour line of the target object in the ultrasound image. The contour extracting unit 106 binarizes the ultrasound image with the determined critical value to produce a binarization image.

The corner detecting unit 108 applies the corner detection algorithm to the contour line extracted in the contour line extracting unit 106, thereby detecting corner points in which a curvature is steeply change. That is, the corner point detecting unit 108 divides the contour line into a plurality of segments, wherein each segment has a predetermined size. The corner point detecting unit 108 measures local characteristics of each segment, thereby detecting the corner points.

The block setting unit 110 sets blocks having a predetermined size, wherein each block contains a corner point. The coordinate recognizing unit 112 recognizes coordinates of a plurality of measure points at which a pointer (e.g., mouse pointer) movable by the user is crossed with the extracted contour line. If a portion of the pointer is overlapped with a portion of a block, then the coordinate recognizing unit 112 recognizes coordinates of the corner point in the corresponding block as the measure point.

The user input unit 118 receives a selection instruction for selecting a measure point on the contour line from the user. If the selection instruction is inputted, a point at which the pointer is positioned is selected as the measure point on the contour line. The storing unit 114 stores the coordinates corresponding to the selected measure point. The input of the selection instruction may be achieved through a mouse click. The user input unit 118 further receives a measure instruction from the user. The measuring unit 116 measures a distance between two measure points in response to the measure instruction, thereby measuring a size of the target object (i.e., length, width, volume, etc.). The input of the measure instruction may be achieved through a double click of the mouse.

The user input unit 118 further receives a movement instruction of the pointer for searching the measure points. The output unit 120 may output the ultrasound image provided from the ultrasound image providing unit 102 and the binarization image produced in the contour extracting unit 106 at the same time. The output unit 120 may output the pointer movable by the user, the measure points whose coordinates are recognized in the coordinate recognizing unit 112, and the size of the target object, which has been measured in the measuring unit 116.

Hereinafter, a method for measuring a size of the target object will be described with reference to FIGS. 2 to 10 in accordance with one embodiment of the present invention. Although the method is described to measure a size of the target object in the 2-dimensional ultrasound image in accordance with one embodiment of the present invention, the method is not limited by the dimension of the ultrasound image. The method may be applied to measure a volume of the target object in the 3-dimensional ultrasound image.

Figure 2:
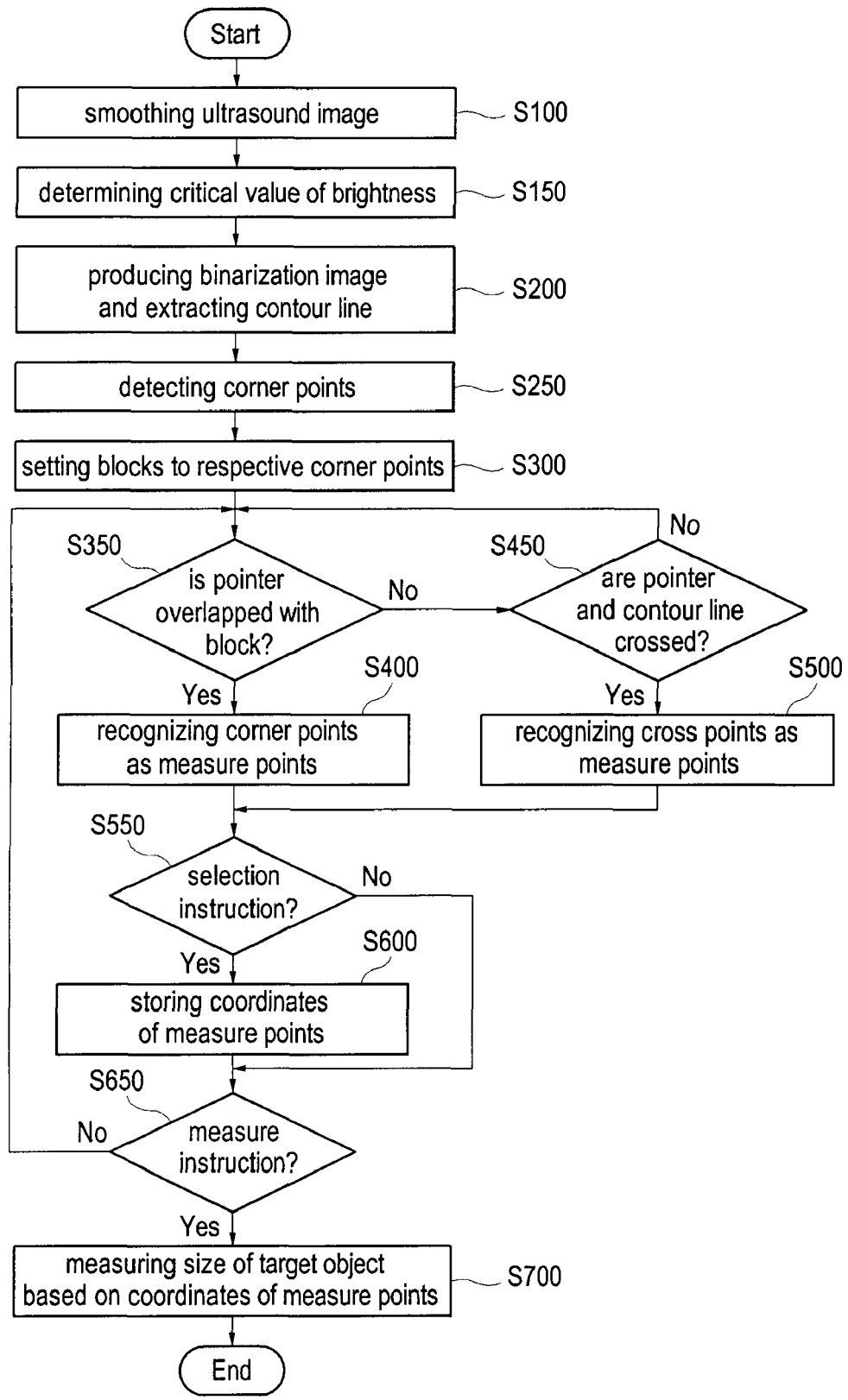
FIG. 2 is a flowchart showing a method for measuring a size of a target object in an ultrasound image in accordance with one embodiment of the present invention.

FIG. 2 is a flowchart showing a method for measuring a size of the target object in accordance with one embodiment of the present invention. First, the filtering unit 104 filters the ultrasound image provided from the ultrasound image providing unit 102 to remove the noises, thereby smoothing the ultrasound image at step S100. In such a case, since the ultrasound image is formed in a gray level, it may be difficult to separate the target object from the background. Therefore, it is preferable to binarize the ultrasound image to form a binarization image.

Figure 3:
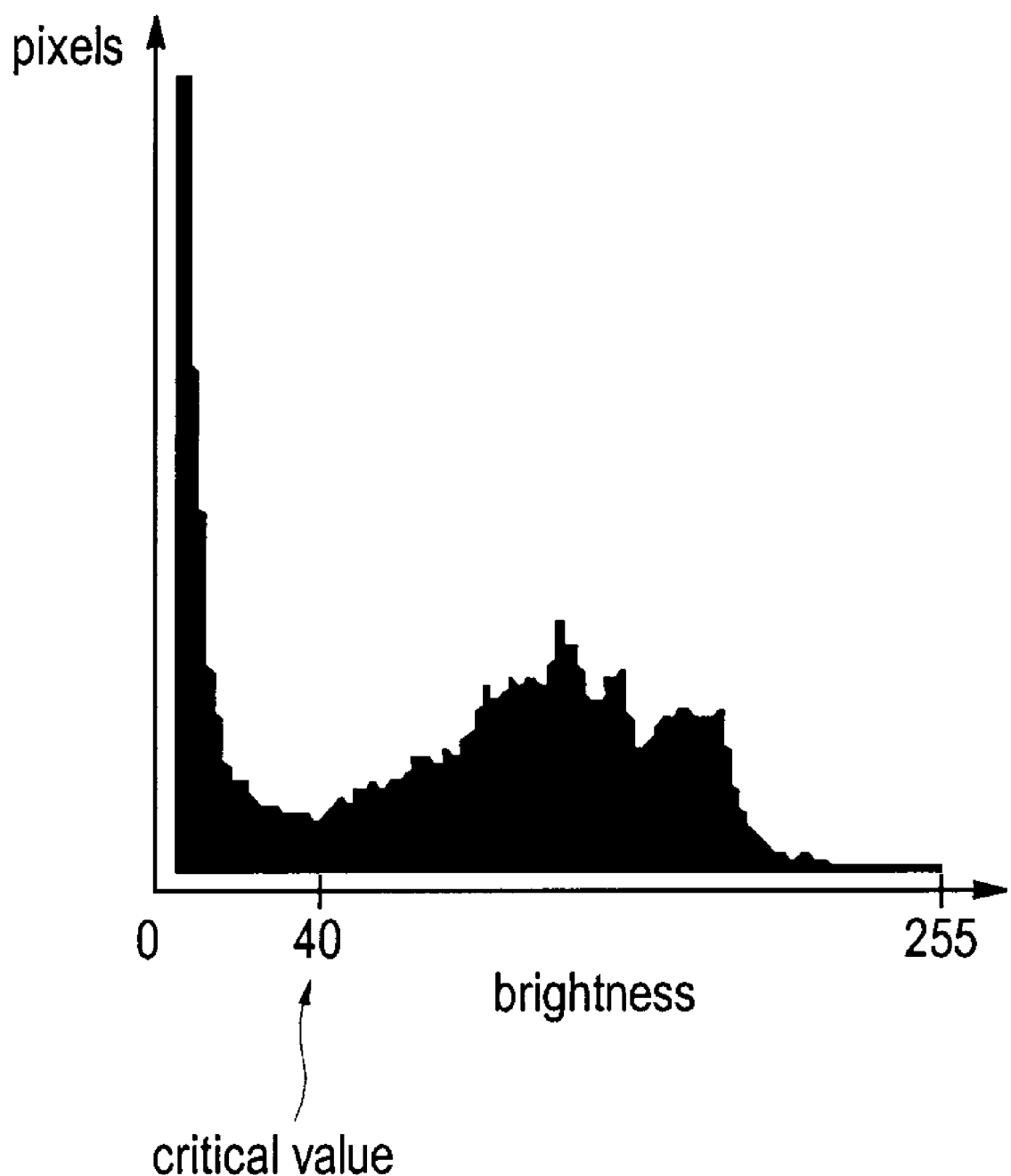
FIG. 3 is a histogram for determining a critical value of brightness in an ultrasound image.
Figure 4:
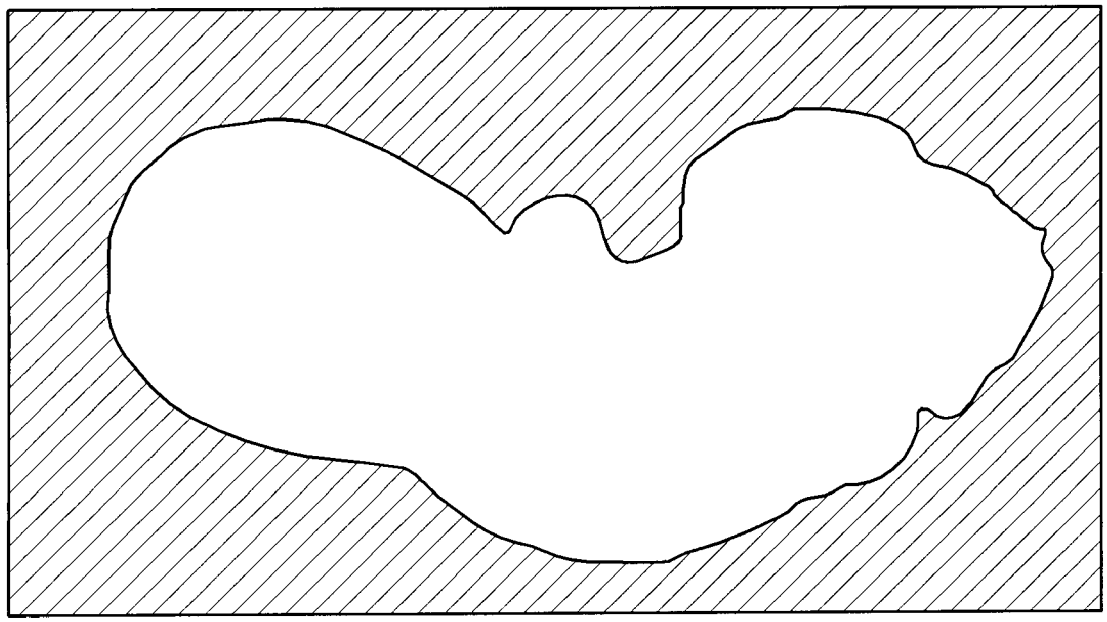
FIG. 4 shows a binarization image in accordance with one embodiment of the present invention.

The contour line extracting unit 106 determines a critical value by using a histogram of the ultrasound image as shown in FIG. 3 at step S150. In FIG. 3, a horizontal axis represents brightness ranging from 0 to 255 levels and a vertical axis represents the numbers of pixels.

If the critical value is determined, the contour extracting unit 106 assigns a pixel value of 0 or 1 to each pixel of the ultrasound image based on the critical value to produce the binarization image, so that a contour line of the target object can be extracted at step S200. As shown in FIG. 3, for example, if the critical value for the brightness is determined as 40, the pixel value of 0 is assigned to pixels having the brightness ranging from 0 to 39 and the pixel value of 1 is assigned to pixels having the brightness ranging from 40 to 255 in the ultrasound image. The region, which is assigned the pixel value of 1 corresponds to the target object and is indicated in white (blank region in FIG. 4). The region, which is assigned the pixel value of 0, corresponds to the background and is indicated in black (dashed line region in FIG. 4). The binarization image is transmitted to the output unit 200 to be outputted together with the ultrasound image, so that the user may select measure points by comparing the ultrasound image and the binarization image.

Figure 5:
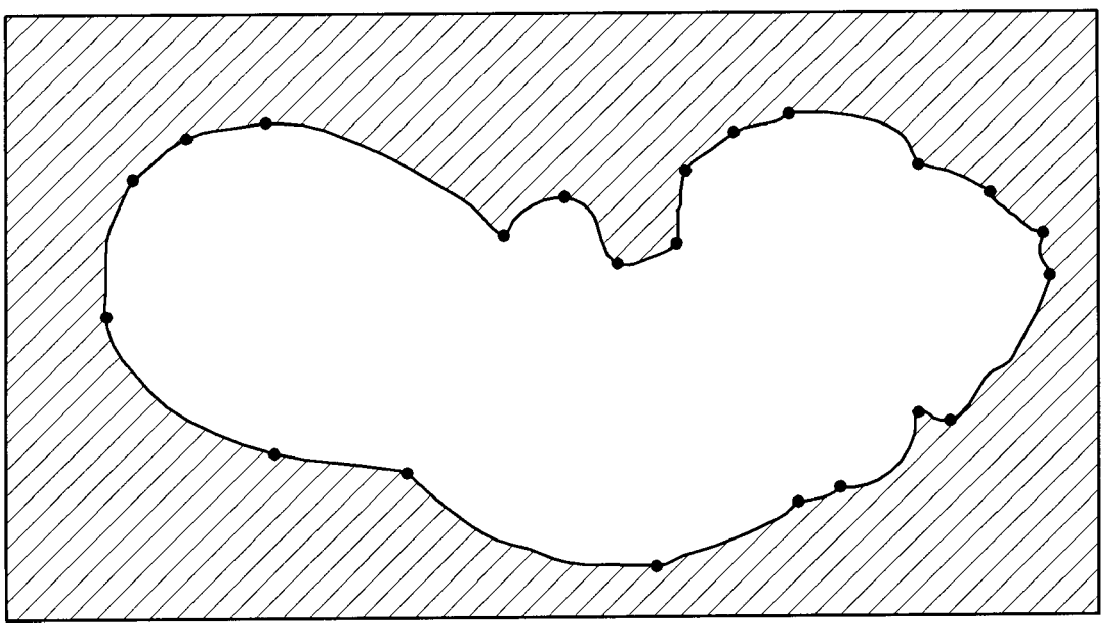
FIG. 5 shows corner points detected from a binarization image shown in FIG. 4.
Figure 6:
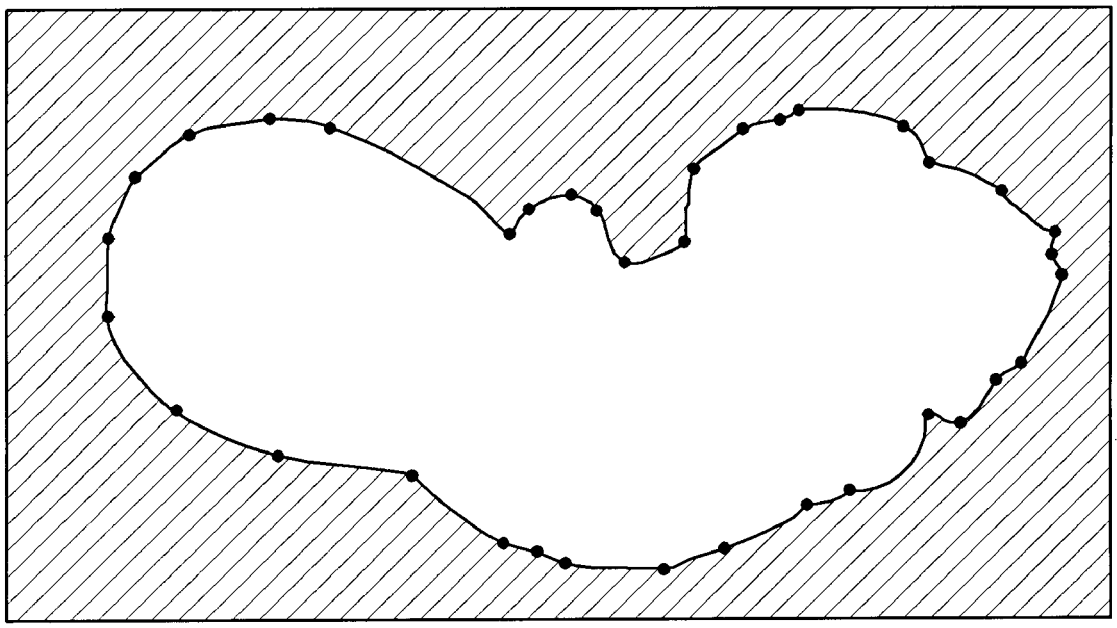
FIGS. 6 and 7 are diagrams showing examples of detecting inappropriate corner points.
Figure 7:
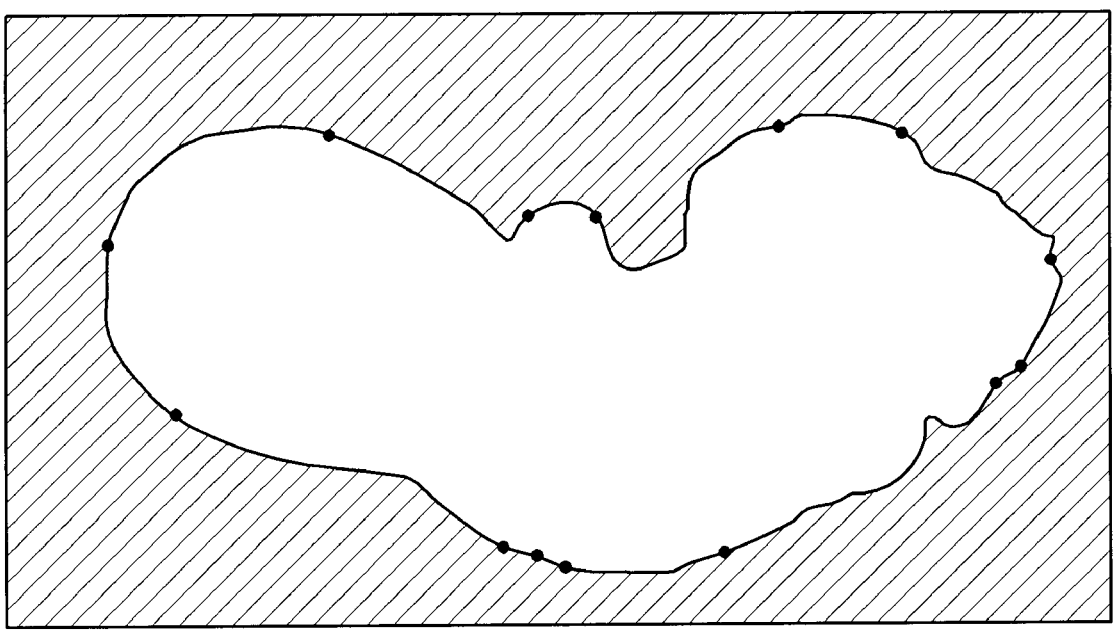

The corner point detecting unit 108 applies corner detection algorithm to the contour line extracted at step S200 to detect corner points at which a curvature is steeply changing at step S250. In order to detect the corner points, the contour line is segmented into a plurality of segments according to shape and characteristic thereof, and then the corner points are detected as illustrated in FIG. 5. In such a case, it is important to segment the contour line in a suitable size. For example, if the contour line is segmented into segments having relatively small sizes, unnecessary corner points may be detected as shown in FIG. 6. On the other hand, if the contour line is segmented into segments having relatively large sizes, corner points corresponding to minutely changing portions may not be adequately detected as shown in FIG. 7.

Figure 8:
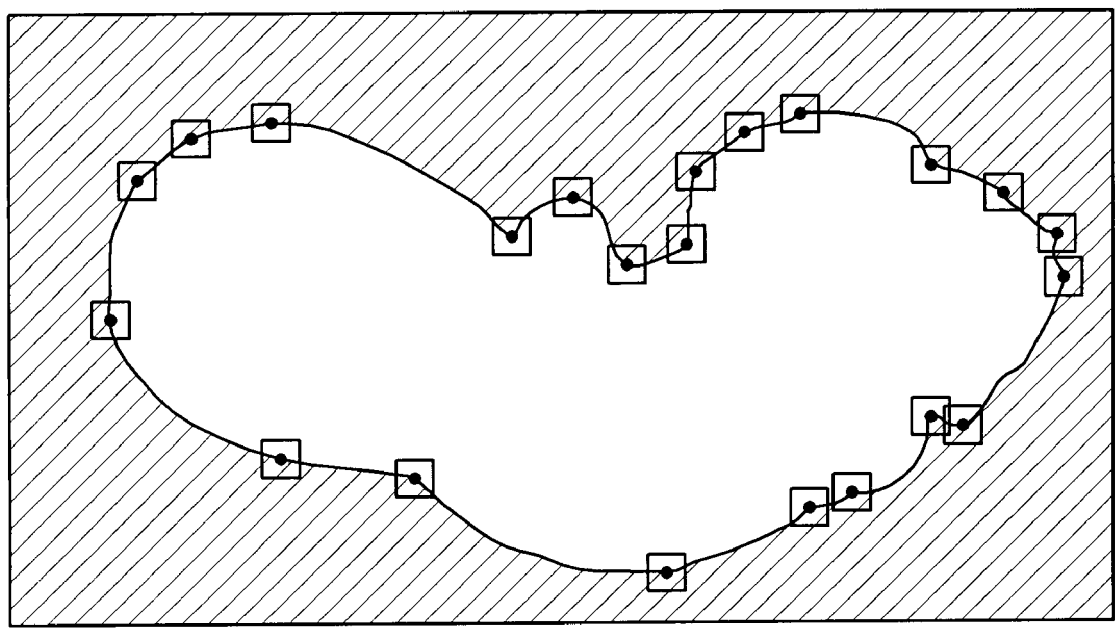
FIG. 8 is a diagram showing an example of blocks set at respective corner points in accordance with one embodiment of the present invention.

After detecting the corner points, a plurality of blocks containing respective corner points are set at step S300. As illustrated in FIG. 8, for example, a predetermined size of a square block containing each corner point is set at step S300. The shape of the block is not limited to a square, and a size is not fixed. The shape and size of the block may be changeable by the user.

The coordinate recognizing unit 112 checks whether a portion of the pointer overlaps a portion of the block at step S350. If it is determined that the portion of the pointer overlaps the portion of the block, the coordinate recognizing unit 112 recognizes coordinates of the corner point position within the corresponding block as one of candidates of the measure points at step S400. Therefore, the user may easily select the corner point, which may be selected as the measure point for measuring a size of the target object, without minute movement of the pointer for selecting a point positioned on the contour line.

On the other hand, if it is determined that the portion of the pointer overlaps the portion of the block, the coordinate recognizing unit 112 determines whether the pointer crosses the contour line at step S450. If the pointer crosses the contour line, the coordinate recognizing unit 112 detects a cross point of the pointer and the contour line and recognizes coordinates of the cross point as one of candidates of the measure points at step S500. Thus, it is possible for the user to select a point on the contour line in addition to the corner points. If the pointer does not cross the contour line, the process goes back to step S350.

Subsequently, it is checked whether a selection instruction, which has inputted from the user, for selecting the measure point among the candidates of the measure points at step S550. If it is determined that the selection instruction is inputted, the storing unit 114 stores coordinates of the selected measure point. In such a case, at least two measure points are selected and the coordinates of the selected measure points are stored in the storing unit 114.

Thereafter, the measuring unit 116 checks whether a measure instruction is inputted through the user input unit 118 by the user at step S650. If it is determined that the measure instruction is inputted, the measure unit 116 measures a distance between the selected measure points, thereby measuring a size of the target object at step S700. The measured size of the target object is transmitted to the output unit 200 to be outputted. On the other hand, if it is determined that the measure instruction is not inputted, the process goes to the step S350.

As mentioned above, since the size of the target object is measured based on the extracted contour line and the coordinates of the corner points, the size of the target object can be easily and accurately measured.

An ultrasound diagnostic apparatus for providing on a display an ultrasound image including a target object and a pointer movable on the ultrasound image, comprises: an ultrasound image providing unit configured to provide an ultrasound image including a target object; a contour line extracting unit configured to extract a contour line of the target object in the ultrasound image; a coordinate recognizing unit configured to detect cross points while the pointer crosses the contour line and recognize the coordinates of the corner points; a user input unit configured to receive instructions from a user, said instructions including a selection instruction to select measure points among the cross points and a measure instruction to measure a size of the target object; a measuring unit configured to measure a size of the target object in response to the measure instruction based on coordinates of the measure points selected in response to the selection instruction; and an output unit configured to output the ultrasound image, the pointer, the contour line, the measure points and the size of the target object.

A method of measuring a size of a target object in an ultrasound image by using a pointer movable by a user request, includes: a) extracting a contour line of the target object in the ultrasound image; b) recognizing coordinates of a plurality of measure points at which the pointer and the contour line are crossed; c) selecting at least two measure points among the plurality of measure points; d) storing coordinates of the selected measure points; and e) measuring a size of the target object based on the coordinates of the selected measuring points.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound diagnostic apparatus for providing on a display an ultrasound image including a target object and a pointer movable on the ultrasound image, comprising:
    an ultrasound image providing unit configured to provide the ultrasound image including the target object;
    a contour line extracting unit configured to extract a contour line of the target object in the ultrasound image;
    a coordinate recognizing unit configured to detect cross points of the pointer and the contour line while the pointer crosses the contour line and recognize coordinates of the cross points;
    a user input unit configured to receive instructions from a user, said instructions including a selection instruction to select measure points among the cross points and a measure instruction to measure a size of the target object;
    a measuring unit configured to measure the size of the target object in response to the measure instruction based on coordinates of the measure points selected in response to the selection instruction; and
    an output unit configured to output the ultrasound image, the pointer, the contour line, the measure points and the size of the target object.

2. The ultrasound diagnostic apparatus of claim 1, further comprising:
    a filtering unit configured to remove noises from the ultrasound image provided from the ultrasound image providing unit; and
    a storing unit configured to store the coordinates of the measure points selected in response to the selection instruction.

3. The ultrasound diagnostic apparatus of claim 1, further comprising:
    a corner detecting unit configured to detecting a plurality of corner points at which a curvature of the contour line is steeply changing; and
    a block setting unit configured to set blocks having a predetermined size, each block containing one of the plurality of corner points,
    wherein, when a portion of the pointer is overlapped on a portion of a block, the coordinate recognizing unit recognizes coordinates of a corner points corresponding to the overlapped block as the measure point.

4. The ultrasound diagnostic apparatus of claim 1, wherein the contour line extracting unit determines a critical value referring to brightness of pixels consisting of the ultrasound image and produce a binarization image based on the critical value, thereby extracting the contour line.

5. The ultrasound diagnostic apparatus of claim 4, wherein the output unit outputs the ultrasound image together with the binarization image.

6. A method of measuring a size of a target object in an ultrasound image by using a pointer movable on the ultrasound image, comprising:
    a) extracting a contour line of the target object in the ultrasound image;
    b) detecting cross points of the pointer and the contour line while the pointer crosses the contour line;
    c) receiving a selection instruction to select measure points among the cross points and recognizing coordinates of the selected measure points; and
    d) measuring a size of the target object based on the coordinates of the measure points.

7. The method of claim 6, further comprising:
    filtering the ultrasound image to remove noises from the ultrasound image; and
    storing the coordinates of the measure points.

8. The method of claim 6, further comprising:
    detecting a plurality of corner points at which a curvature of the contour line is steeply changing; and
    setting blocks with reference to respective corner points, each block not being overlapped,
    wherein, when a portion of the pointer is overlapped on a portion of a block, coordinates of corner points corresponding to the overlapped blocks are recognized as a measure point.

9. The method of claim 6, wherein the step a) includes:
    a1) determining a critical value with reference to brightness of pixels consisting of the ultrasound image;
    a2) producing a binarization image based on the critical value; and
    a3) extracting the contour line of the target object from the binarization image.

10. The method of claim 9, wherein the ultrasound image is output together with the binarization image are.

* * * * *